US009568592B1

(12) United States Patent
Brown et al.

(10) Patent No.: US 9,568,592 B1
(45) Date of Patent: Feb. 14, 2017

(54) AUTOMOTIVE SENSOR ALIGNMENT WITH EXTERNAL IMU TOOL

(71) Applicant: Google Inc., Mountain View, CA (US)

(72) Inventors: Adam Brown, Mountain View, CA (US); Russell Leigh Smith, San Jose, CA (US)

(73) Assignee: Google Inc., Mountain View, CA (US)

( * ) Notice: Subject to any disclaimer, the term of this patent is extended or adjusted under 35 U.S.C. 154(b) by 319 days.

(21) Appl. No.: 14/532,729

(22) Filed: Nov. 4, 2014

(51) Int. Cl.
 *G01S 7/40* (2006.01)
 *G01S 13/93* (2006.01)
 *G01S 13/00* (2006.01)

(52) U.S. Cl.
 CPC ............... *G01S 7/40* (2013.01); *G01S 7/4004* (2013.01); *G01S 13/931* (2013.01)

(58) Field of Classification Search
 CPC ........... G01S 7/02; G01S 7/40; G01S 7/4004; G01S 7/4008; G01S 7/4021; G01S 7/4026; G01S 13/88; G01S 13/93; G01S 13/931; B64G 1/22; B64G 1/24; B64G 1/28; F41G 1/54
 See application file for complete search history.

(56) References Cited

U.S. PATENT DOCUMENTS

| 5,245,909 | A | * | 9/1993 | Corrigan | F41G 1/54 89/41.19 |
|---|---|---|---|---|---|
| 7,090,170 | B1 | * | 8/2006 | Kau | B64G 1/28 244/164 |
| 8,037,754 | B2 | | 10/2011 | Eriksen et al. | |
| 8,552,350 | B2 | | 10/2013 | Bielas et al. | |
| 8,730,115 | B2 | | 5/2014 | Yeshanov et al. | |
| 2008/0071476 | A1 | | 3/2008 | Hoshizaki | |

* cited by examiner

*Primary Examiner* — Bernarr Gregory
(74) *Attorney, Agent, or Firm* — McDonnell Boehnen Hulbert and Berghoff LLP (57) ABSTRACT

An inertial measurement unit (IMU) may be used to align a plurality of radar units coupled to a vehicle via a plurality of mounting structures. The IMU may be placed at a reference location and reference-location data may be captured. The IMU may be coupled to each of the mounting structures and, at each mounting structure, respective mounting-location inertial measurement data may be captured using the IMU. For each mounting structure, a measured roll angle, measured elevational angle, and measured azimuthal angle is determined based on at least the mounting-location inertial measurement obtained at the mounting structure and the reference inertial measurement. Further, for each mounting structure, offsets are determined for the measured roll angle, the measured elevational angle, and the measured azimuthal angle. One or more of the mounting structures and/or radar units are adjusted based on one or more of the offsets.

20 Claims, 5 Drawing Sheets

AUTOMOTIVE SENSOR ALIGNMENT WITH EXTERNAL IMU TOOL

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to a millimeter (mm) wave electromagnetic wave length (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to an automotive sensor alignment with external inertial measurement unit tool. In one aspect, the present application describes a method of mounting a plurality of radar units to a vehicle via a plurality of mounting structures on the vehicle, such that each radar unit is coupled to a respective mounting structure. The method includes placing an inertial measurement unit (IMU) at a reference location and obtaining a reference-location inertial measurement using the IMU at the reference location. The method also includes coupling the IMU to each of the mounting structures on the vehicle in a sequence. While the IMU is coupled to each mounting structure, the method includes obtaining a respective mounting-location inertial measurement using the IMU. For each mounting structure, the method includes determining a measured roll angle, measured elevational angle, and measured azimuthal angle based on at least the mounting-location inertial measurement obtained at the mounting structure and the reference inertial measurement. Further, for each mounting structure, the method includes determining an elevational offset based on a difference between the measured elevational angle and a target elevational angle. Additionally, for each mounting structure, the method includes determining a roll offset based on a difference between the measured roll angle and a target roll angle. Yet further, for each mounting structure, the method includes determining an azimuthal offset based on a difference between the measured azimuthal angle and a target azimuthal angle. Furthermore, the method includes mounting the plurality of radar units to the vehicle via the plurality of mounting structures. The mounting includes adjusting at least one of the radar units or mounting structures based on the at least one of the elevational offset, roll offset, and azimuthal offset.

In another aspect, the present application describes an apparatus. The apparatus includes an IMU. Additionally, the apparatus includes a mounting plate configured to couple the IMU to each of a plurality of mounting structures on a vehicle, where each of the mounting structures is configured to couple to a respective radar unit. The apparatus also includes a computational unit configured to perform operations. The computational unit is configured to obtain a reference-location inertial measurement via the IMU located at a reference location. The computational unit is further configured to obtain respective mounting-location inertial measurements via the IMU to when the IMU is coupled to each of the mounting structures in a sequence. Additionally, for each mounting structure, the computational unit is configured to determine a measured elevational angle, a measured roll angle, and measured azimuthal angle based on (i) at least the mounting-location inertial measurement obtained at the mounting structure and (ii) the reference inertial measurement. Further, for each mounting structure, the computational unit is configured to determine an elevational offset based on a difference between the measured elevational angle and a target elevational angle. Moreover, for each mounting structure, the computational unit is configured to determine a roll offset based on a difference between the measured roll angle and a target roll angle. Furthermore, for each mounting structure, the computational unit is configured to determine an azimuthal offset based on a difference between the measured azimuthal angle and a target azimuthal angle.

In yet another example, a computing device is provided. The computing device may include a processor and a computer readable medium having stored thereon program instructions that when executed by the processor cause the computing device to perform functions. The functions include obtaining a reference-location inertial measurement using the inertial measurement unit (IMU) at the reference location. The IMU can be coupled to each of a plurality of mounting structures on a vehicle. And, each of the mounting structures is configured to couple to a respective radar unit. The functions also include, using the IMU to obtain a respective mounting-location inertial measurements when the IMU is coupled to each of the mounting structures in a sequence. For each mounting structure, the functions include determining a measured roll angle, measured elevational angle, and measured azimuthal angle based on at least the mounting-location inertial measurement obtained at the mounting structure and the reference inertial measurement. Additionally, for each mounting structure, the functions include determining an elevational offset based on a difference between the measured elevational angle and a target elevational angle. Further, for each mounting structure, the functions include determining a roll offset based on a difference between the measured roll angle and a target roll angle. Furthermore, for each mounting structure, determining an azimuthal offset based on a difference between the measured azimuthal angle and a target azimuthal angle.

In another aspect, the present application describes an apparatus. The apparatus may be configured for automotive sensor alignment. The apparatus may further include a means for coupling a measurement means to each of a plurality of mounting structures on a vehicle, where each of the mounting structures is configured to couple to a respective radar unit. The apparatus also includes a computational means. The computational means is configured to use the measurement means to obtain a reference-location inertial measurement. The computational means is further configured to obtain respective mounting-location inertial measurements via the measurement means to when the measurement means is coupled to each of the mounting structures. Additionally, for each mounting structure, the computational means is configured to determine a measured elevational angle, a measured roll angle, and measured azimuthal angle based on (i) at least the mounting-location measurement means obtained at the mounting structure and (ii) the reference inertial measurement. Further, for each mounting structure, the computational means is configured to determine an elevational offset based on a difference between the measured elevational angle and a target elevational angle. Moreover, for each mounting structure, the computational means is configured to determine a roll offset based on a difference between the measured roll angle and a target roll angle. Furthermore, for each mounting structure, the computational means is configured to determine an azimuthal offset based on a difference between the measured azimuthal angle and a target azimuthal angle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for automotive sensor alignment using an inertial measurement unit (IMU). In practice, vehicular radar systems may feature multiple radar units with each radar unit having an associated field of view. Typically, the alignment of the various radar units was a time-consuming labor-intensive procedure requiring precise measurements and many expensive tools. The apparatus and methods presented herein allow the precise alignment of radar units in a more time efficient and equipment-efficient manner.

Traditionally, vehicular radar systems have featured a single radar unit looking in a forward direction. These traditional radar systems would also typically only direct the radar beam in a single direction. When a vehicle has only a single radar unit with a beam that only was directed in a single direction, the precision required in the placement of the radar unit may be not as great as systems with multiple radar units with steerable beams. The non-steerable beam only interrogating one direction may cause the lower precision requirement. For example, a traditional vehicular radar system may only be configured to detect the presence of another vehicle directly in front of the vehicle having the radar system. Thus, as long as a radar beam generally points in the forward direction the traditional radar system would be able to detect the vehicle.

More advanced radar systems may be used with a vehicle in order to obtain a wider field of view than just that directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the car. In some examples, multiple radar units may be combined with steerable radar beams to further increase the interrogation region and the imagining resolution of the vehicular radar system.

An example radar system for use with the present disclosure may include multi-sector 90 degree field of view radar antenna architecture that may enable an antenna to both scan across approximately 90-degrees of the azimuth plane (e.g. the horizontal plane) while also being mountable on various surfaces of a vehicle. Having a radar antenna with a 90 degree field of view may enable a radar system to scan a full 360 azimuth plane by having four radar units each configured to scan one 90-degree non-overlapping sector. Therefore, the example disclosed radar system may be able to steer a radar beam to interrogate the entire region in the azimuth plane of the vehicle. So that for example, four such radars located on four corners of a car would provide a full 360 coverage around the car. For example, a system such as this may aid in autonomous driving of a vehicle.

When each radar unit can scan or span a 90-degree region, placing 4 radar units on a vehicle may enable the vehicle to scan a beam over the full 360 azimuth plane. Each of the four radar units may be configured to scan a beam over one sector (i.e. one quarter of the azimuth plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360 azimuth plane.

In some examples, the radar sectors may be defined based on where the radar units may be mounted on the vehicle. In one example, one radar unit may be mounted in each of the side mirrors of the vehicle. The other two radar units may be mounted behind the taillights of the vehicle. In this example, the quadrants may be defined based on axes where one axis aligns with the direction of vehicular motion and the other axis aligns with the middle of the vehicle from front to back. In another example, the radar units may be mounted in order to have one pointing forward, one pointing backward, and one pointing to each side. In this second example, the axes of the quadrants may be at a 45 degree angle to the direction of motion of the vehicle. Additionally, the radar unit may be mounted on top of the vehicle.

The modular multi-sector 90 degree field of view radar antenna architecture may be able to steer the radar beams emitted from each radar unit. The radar beams may be steered by the radar units in various ways. For example, in some embodiments, the radar units may be able to steer the beam in an approximately continuous manner across the 90 degree field of view for the respective antenna or the radar units may be configured with sectoral sub beams spanning the 90 degrees. In other embodiments, the radar units may be able to steer the radar beam to predetermined directions within the 90 degree field of view for the respective antenna.

Figure 1:
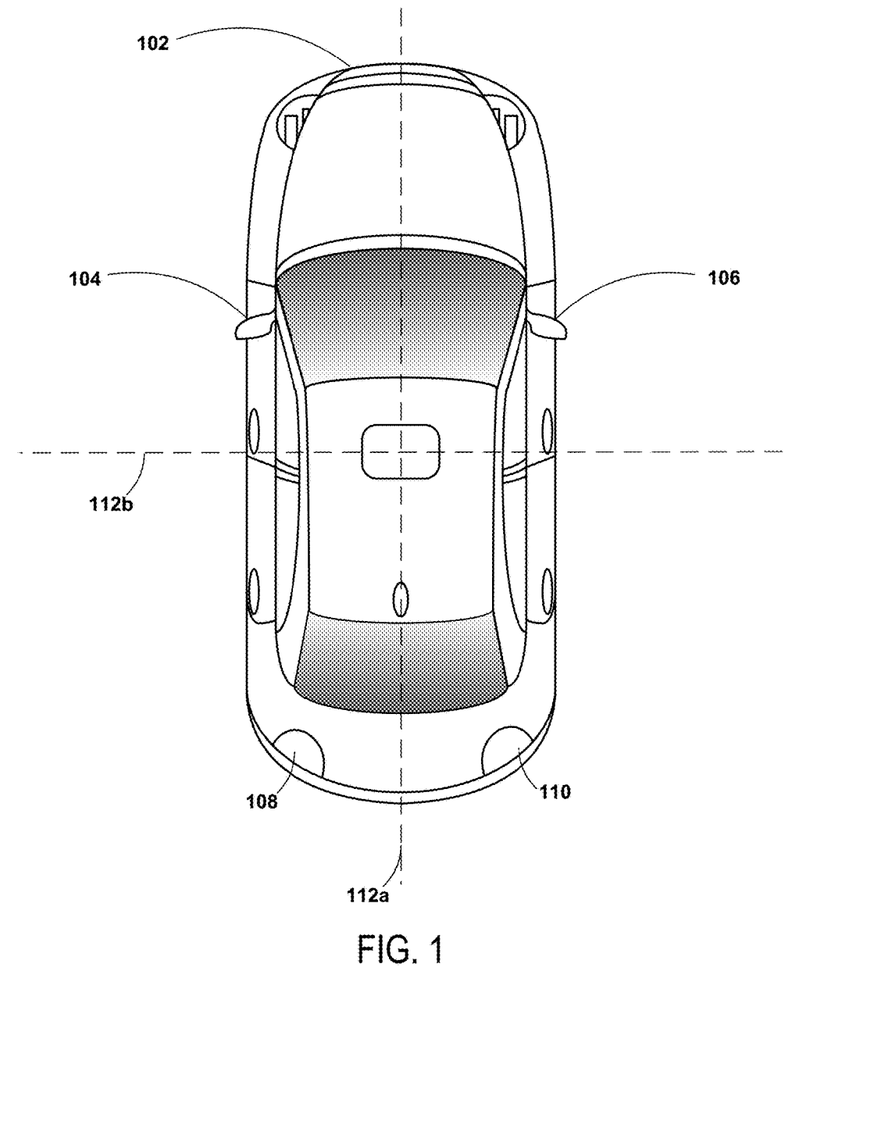
FIG. 1 illustrates an example layout of radar sectors.

FIG. 1 illustrates an example layout of radar sectors for an autonomous vehicle 102. As shown in FIG. 1, each of the radar sectors may have an angular width approximately equal to the scanning range of the radar units (as will be described with respect to FIG. 2). For example, the sectors of FIG. 1 divide the azimuth plane around the autonomous vehicle 102 into 90 degree sectors. However, in examples where the radar units are configured to scan a radar beam over a different angle than 90 degrees, the width and number of sectors may change.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45 degree angle with respect to the two axes of the vehicle 102. By mounting the radar units a 45 degree angle with respect to the two axes of the vehicle 102, a 90 degree scan of the radar unit would scan from one vehicle axis to the other vehicle axis. For example, a radar unit mounted at a 45 degree angle to the axes in side mirror unit 104 may be able to scan the front left sector (i.e. from the vertical axis 112a through the front of the vehicle 102 to the axis 112b that runs through the side of the vehicle). An additional radar unit may be mounted at a 45 degree angle to the axes in side mirror unit 106 may be able to scan the front right sector. In order to scan the back right sector, a radar unit may be mounted in taillight unit 110. Additionally, in order to scan the back left sector, a radar unit may be mounted in taillight unit 108. The radar unit placements shown in FIG. 1 are merely one example. In various other examples, the radar units may be placed in other locations, such as on top of the vehicle, or within or behind other vehicle components. Further, the sectors may also be defined differently in various embodiments. For example, the sectors may be at a 45 degree angle with respect to the vehicle. In this example, one radar unit may face forward, another backward, and the other two to the sides of the vehicle.

In some examples, all the radar units of vehicle 102 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, a vehicle 102 with one radar unit would need that radar unit to be able to scan over the full 360 degrees.

If the vehicle 102 had two radar units, each would scan approximately 180 degrees. For three radar units, each would be configured to scan 120 degrees. For four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 2:
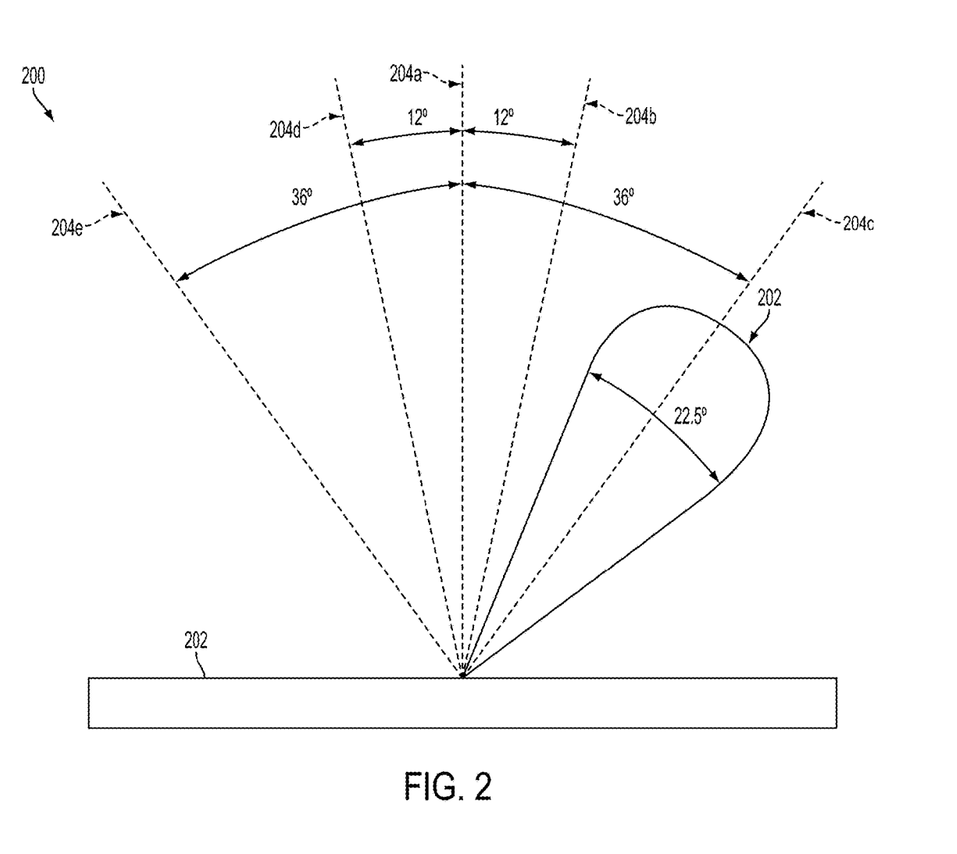
FIG. 2 illustrates example beam steering for a sector for a radar unit.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth plane. In other embodiments, the radar unit 200 may be able to scan the radar beam in discrete steps across the various angles of the azimuth plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90 degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees 604e, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of the radar beam 206 may be varied depending on the specific example.

For example, and further discussed below, a radar beam of a radar unit may be configured to only scan a 60 degree region. If a radar unit can scan a 60 degree region, six radar units may be used to scan a full 360 azimuth plane. However, if the radar unit can scan 90 degrees, four radar units may scan the full 360 azimuth plane.

Figure 3:
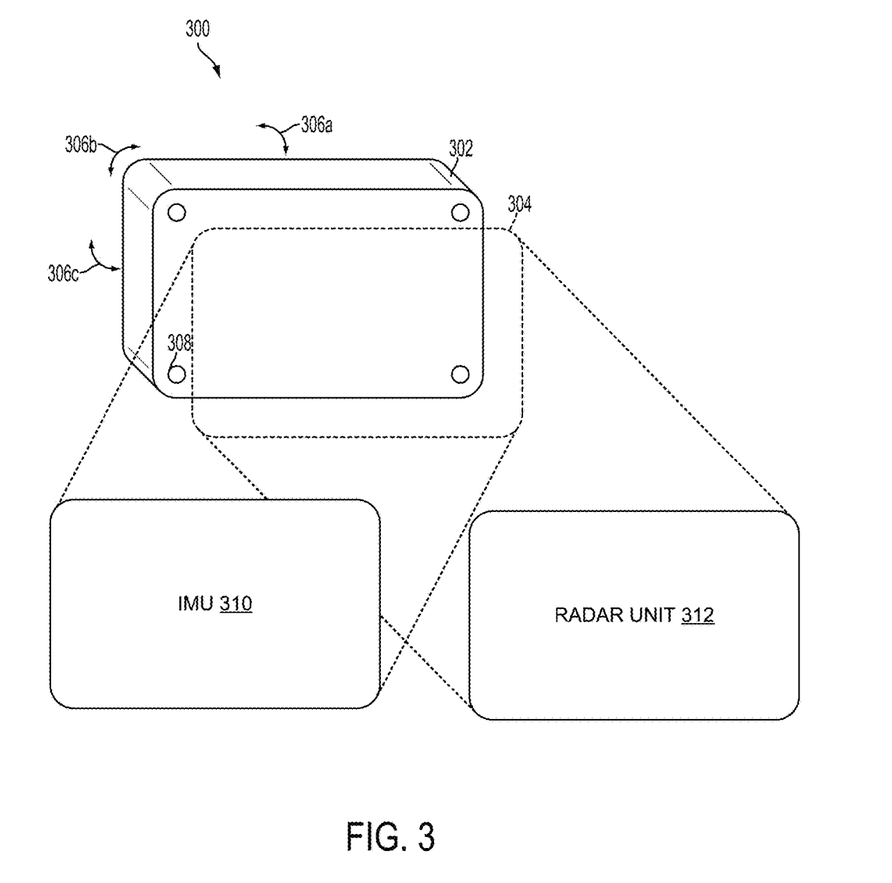
FIG. 3 illustrates an example radar unit mounting.

FIG. 3 illustrates an example radar unit mounting structure 300. In one example embodiment, a radar unit mounting 300 may include a mounting baseplate 302 and an associated mounting location 304 where an IMU 310 and/or a radar unit 312 may be mounted to the mounting baseplate 302. The mounting location 304 may be the location where an IMU 310 may be mounted to the mounting baseplate 302 while performing method 500 of FIG. 5. Additionally, during operation of the autonomous vehicle, radar units 312 may be mounted to the mounting baseplate 302 in place of mounting location 304. In yet further embodiments, mounting location 304 may be the location where an IMU 310 may be mounted to a radar unit 312 that is already mounted to the mounting baseplate 302 while performing method 500 of FIG. 5. Thus, the IMU 310 may mount to a surface of the radar unit 312 while the radar unit is coupled to the mounting location 304. In even further embodiments, the radar unit 312 and the mounting baseplate 302 may be integrated as one unit and not separate components.

The IMU 310 may be an apparatus configured with a housing that contains both an IMU 312 unit and a baseplate configured to mount to mounting baseplate 302 of the vehicle. The housing may be further configured to protect the IMU from damage. The housing may also include either a computing device or an interface to couple the IMU unit to a computer. The computer or the computing device may be configured to capture data and perform calculations based on the data from sensors in the IMU.

A mounting baseplate may be located at each location where a radar unit may be coupled to the autonomous vehicle. For example, each radar unit mounting location (such as locations 104, 106, 108, and 110 of FIG. 1) may have a mounting baseplate 302 to which a radar unit may be mounted. As shown in FIG. 3, the mounting baseplate 302 may include mounting holes (one of which is labeled 308) configured to both align the radar unit when mounted as well as allow the radar unit to be coupled to the mounting baseplate 302 with attachment devices such as screws. The mounting baseplate 302 of FIG. 3 is one example of a way the various radar units may be mounted to an autonomous vehicle.

The mounting baseplate 302 may be adjustable in order to provide the ability to align the mounting baseplate 302 to a radar unit coupled to the mounting baseplate 302 such that the radar unit is pointed in a correct direction. For example, the mounting baseplate 302 may be adjustable in terms of the elevational angle 306a, roll angle 306b, and azimuthal angle 306c. In some embodiments, it may be desirable for a radar unit to be mounted within a threshold range around a desired direction. For example, each of the elevational angle 306a, roll angle 306b, and azimuthal angle 306c may have a threshold range of ±1 degree from the desired elevational angle, roll angle, and azimuthal angle. Therefore, it may be desirable to accurately measure each of the elevational angle 306a, roll angle 306b, and azimuthal angle 306c associated with each mounting baseplate 302.

Figure 4:
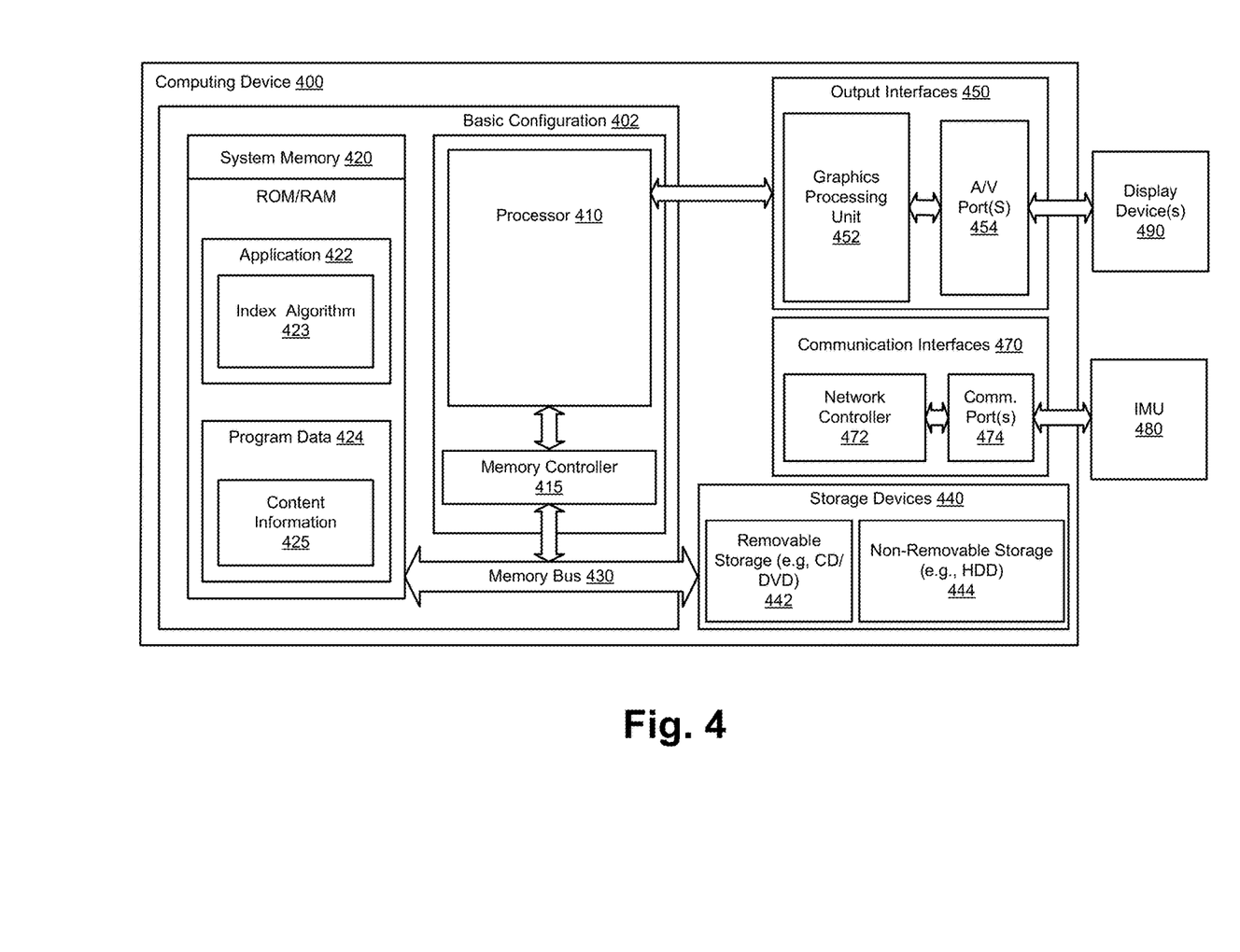
FIG. 4 illustrates an example computing device for performing some of the methods disclosed herein.

In some embodiments, a computing device may implement the disclosed methods as computer program instructions encoded on a non-transitory computer-readable storage media in a machine-readable format, or on other non-transitory media or articles of manufacture. The computing device may be integrated within the IMU unit or it may be a separate computing device in communication with the IMU unit. FIG. 4 is a schematic illustrating a conceptual partial view of an example computer program product that includes a computer program for executing a computer process on a computing device, arranged according to at least some embodiments presented herein.

FIG. 4 illustrates a functional block diagram of a computing device 400, according to an embodiment. The computing device 400 can be used to perform functions in connection with a reconfigurable mobile device with a balloon network. In particular, the computing device can be used to perform some or all of the functions discussed above in connection with FIGS. 1-6. As shown in FIG. 4, the IMU 480 is located external to the computing device 400, however, in some examples, the computing device 400 may be located within an IMU unit.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (μP), a microcontroller (μC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, such as IMU 480, over a network communication by way of one or more communication ports 474. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium 803 such as, but not limited to, a hard disk drive, a CD, a DVD, a digital tape, or memory. In some implementations, the signal bearing medium 801 can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard or other transmission protocol).

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
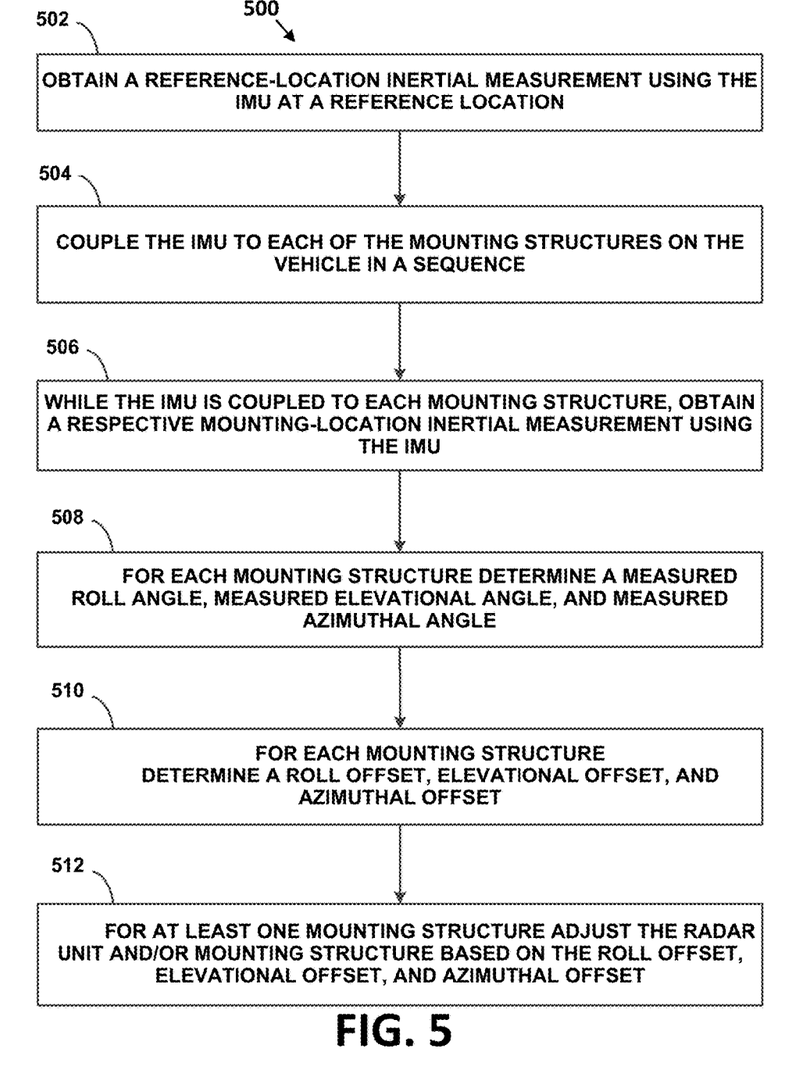
FIG. 5 is an example method for automotive sensor alignment with external inertial measurement unit tool.

FIG. 5 is an example method for automotive sensor alignment with external inertial measurement unit tool. Moreover, the method 500 of FIG. 5 will be described in conjunction with FIGS. 1-4. A vehicular radar system may be configured to interrogate the region around the vehicle via multiple radar units. To interrogate the region around the vehicle, the radar system may transmit the radar beam in a given direction. The transmitted beam may reflect off objects in the region, and the radar unit may receive these reflections. The received reflections may allow the radar system and a computer to determine what objects are located near the vehicle. Not only may objects themselves be determined, but the location (i.e. angle and range to objects) may be determined as well. In order to operate correctly, radar units of the radar system need to both be placed in correct locations and have fairly precise alignment. Method 500 provides automotive sensor alignment using external inertial measurement unit tool to precisely align each radar unit.

At block 502, the method 500 includes obtaining a reference-location inertial measurement using the IMU at a reference location. The reference location could be a location on the vehicle (e.g., at a mounting structure) or a location away from the vehicle. While at the reference location, the IMU may make a first measurement. The first measurement allows the computing device to calculate reference parameters. The reference parameters may be used to determine an impact of the rotation of the Earth that is present in the measurements. Additionally, the reference parameters may be used to calculate a sensor drift. The sensor drift measurement may be used to verify an accuracy of the measurements performed as part of method 500.

In an illustrative embodiment, IMU may include both accelerometers and gyroscopes, which may be used together to determine the orientation of the IMU. In particular, the accelerometers can measure the orientation of the IMU with respect to Earth, while the gyroscope measures the rotation around an axis. Some IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. For example, an IMU using accelerometers and 3-ring laser gyroscopes may be used as well.

In some examples, an IMU 502 may include other sensors, in addition to accelerometers and gyroscopes, which may help to better determine position and/or help to increase the accuracy of measurements. Two examples of such sensors are magnetometers and pressure sensors. Other examples are also possible. Further, the IMU may be coupled to a computer either via a wire or wirelessly. The computer may be able to store data from the IMU, record information related to the location of the IMU, and also perform calculations based on the data received from the IMU. In some further embodiments, the IMU may have a computation device built in so no coupling to an external computer is needed.

The reference location at which the measurement of block 502 is made can be one of several different locations. In some embodiments, block 502 is performed before the IMU is coupled to the autonomous vehicle. In this embodiment, the first measurement is used to determine the effect Earth's rotation and gravity has on the IMU sensors before the IMU is coupled to a mounting structure for a radar unit of the vehicle. In another embodiment, the IMU may be coupled to a first one of the plurality of mounting structures for the radar units of the autonomous vehicle. In this embodiment, the first measurement is used to determine the effect Earth's rotation and gravity has on the IMU sensors as well as measurement parameters of the first radar mounting structure.

At block 504, the method 500 includes coupling the IMU to each of the mounting structures on the vehicle in a sequence. The IMU may be moved and coupled to each of the radar unit mounting structures. The IMU may be moved in a specific order or the IMU may be attached to the various mounting structures in a random order. However, when the IMU is a moved to a new mounting structure, the specific mounting structure may be indicated to a computer making the calculations associated with the IMU.

In some examples, at block 504, the IMU may be coupled to a radar unit that is already attached to a mounting structure. Thus, the IMU may be coupled to a face of the radar unit to measure the direction in which the IMU is pointed. In this example, the radar units may be integrated (i.e. part of) the mounting structure. In this example, the IMU will measure the direction and orientation of the radar unit, rather than the direction and orientation of the mounting structure. Although the measurement is slightly different, the calculations and performed as part of method 500 may be similar.

At block 506, the method 500 includes, while the IMU is coupled to each mounting structure, obtaining a respective mounting-location inertial measurement using the IMU. A computer or the IMU may be configured to capture data at each of the various mounting structures to which the IMU is coupled. At each location, the data collected may be related to the movement the IMU went through as it was moved from one mounting structure to the next mounting structure. Additionally, the data collected may be related to the movement the IMU went through as it was moved from the reference location that was not a mounting structure to the first mounting structure.

The inertial measurements that can be captured via the IMU may include measurements based on the gyroscope and accelerometers in the IMU. These sensors may allow the IMU (and associated computer) to precisely determine both the location of the IMU and the orientation of the IMU relative to a previous location. Thus, the data captured may be data related to the translation (or movement) of the IMU between locations where data is captured. Therefore, the data may be used to determine the movement of the IMU between the various locations. Further, the data from the reference location may be used to remove measurement effects caused by the movement of the Earth.

In some embodiments, block 506 may also include repeating the first measurement after measurements have been made at each of the mounting structures. By repeating the first measurement after all the measurements have been completed, a sensor drift may be calculated. A sensor drift is change in a sensor output that varies with time. A sensor drift may be caused by the physical properties of the sensor, the movement of the Earth, or in other ways. In some examples, if the sensor drift is greater than a threshold sensor drift, an alert may be issued that the measurements should be performed again. When the sensor drift exceeds a threshold sensor drift it may indicate that measurement data may not be accurate. The alert may be issued by the IMU unit itself or via a computing device coupled to the IMU.

At block 508, the method 500 includes for each mounting structure determining a measured roll angle, measured elevational angle, and measured azimuthal angle. Based on the data captured at block 506, a computing device may be able to calculate various parameters for each of the mounting structures. For example, the computing device may be configured to use the inertial measurements to determine the orientation of each mounting structure with respect to each other mounting structure.

As part of the calculations, the computing device may be able to calculate a measured roll angle, a measured elevational angle, and a measured azimuthal angle for each of the mounting structures. The roll angle of the mounting structure may relate to a rotation of the mounting structure with respect to the normal direction of the surface of the mounting structure. The roll angle may be described by roll angle 306*b* of FIG. 3. The elevation angle of the mounting structure may relate to a rotation of the mounting structure with respect to the horizon (i.e. with respect to the plane in which the vehicle travels). The elevation angle may be described by elevation angle 306*a* of FIG. 3. The azimuth angle of the mounting structure may relate to a rotation of the mounting structure within the plane of the horizon (i.e. within the plane in which the vehicle travels). The azimuth angle may be described by azimuth angle 306*c* of FIG. 3.

At block 510, the method 500 includes for each mounting structure determining a roll angle offset, elevational angle offset, and azimuthal angle offset. Once the measured roll angle, the measured elevational angle, and the measured azimuthal angle for each of the mounting structures has been calculated, the computing device may be able to determine a roll angle offset, an elevational angle offset, and an azimuthal angle offset for each of the mounting structures. The offset may be the difference between a predetermined angle for each of the roll, elevation, and azimuth and the respective measured value. The predetermined angle for each of the roll, elevation, and azimuth may be stored in the computing device. The predetermined angle for each of the roll, elevation, and azimuth may be based on the number and orientation of mounting structures.

In some examples, the offset may be measured in degrees. Additionally, in some further examples, one (or more) of the offsets may be determined to be zero degrees in examples where one of the mounting structures has a correct alignment with respect to one of the angles.

At block 512, the method 500 includes for at least one mounting structure adjusting the radar unit and/or mounting structure based on the roll offset, elevational offset, and azimuthal offset. Each determined offset may be compared to an offset threshold. The offset threshold may be the same for each of the roll, elevational, and azimuthal offsets. However, in some situations, each of the roll, elevational, and azimuthal offsets may have a different threshold offset. If the determined offset for the roll, elevational, and azimuthal offsets is greater than the threshold, the radar unit and/or mounting structure may be adjusted to each of the roll, elevational, and azimuthal offsets are within the respective threshold.

In some examples, a computing device may provide offset adjustment information. The information may be provided as a number of degrees and the direction in which the adjustment needs to be made. In another example, the computing device may report a number of shims that the respective radar unit and/or mounting structure needs to be adjusted by. A shim may be a screw or other adjustment means configured to adjust at least one of the angles of the radar unit and/or mounting structure. In another example, the IMU may be coupled to the mounting structure while it is adjusted. The IMU or a computer coupled to the IMU may provide an alert when the mounting structure was adjusted to bring each of the roll, elevational, and azimuthal offsets within the respective offset thresholds.

Further, in some examples, block 512 may include mounting a radar unit to the mounting structure. The radar unit may be mounted to the mounting structure before or after the radar unit and/or mounting structure is adjusted based on the calculated offsets. Thus, in this example, after block 512, a radar unit may be mounted to the vehicle and pointed in a direction within the threshold range of the desired direction (i.e. orientation) of the radar unit.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method of mounting a plurality of radar units to a vehicle via a plurality of mounting structures on the vehicle such that each radar unit is coupled to a respective mounting structure, the method comprising:
   obtaining a reference-location inertial measurement using an inertial measurement unit (IMU) at a reference location;
   coupling the IMU to each of the mounting structures on the vehicle in a sequence;
   while the IMU is coupled to each mounting structure, obtaining a respective mounting-location inertial measurement using the IMU; and
   for each mounting structure:
      determining a measured roll angle, measured elevational angle, and measured azimuthal angle based on at least the mounting-location inertial measurement obtained at the mounting structure and the reference inertial measurement;
      determining an elevational offset based on a difference between the measured elevational angle and a target elevational angle;
      determining a roll offset based on a difference between the measured roll angle and a target roll angle;
      determining an azimuthal offset based on a difference between the measured azimuthal angle and a target azimuthal angle; and
   mounting the plurality of radar units to the vehicle via the plurality of mounting structures, wherein the mounting comprises adjusting at least one of the radar units or mounting structures based on the at least one of the elevational offset, roll offset, and azimuthal offset.

2. The method according to claim 1, wherein the reference-location inertial measurement comprises a measurement of movement of the Earth.

3. The method according to claim 1, wherein the reference location is located away from the vehicle.

4. The method according to claim 1, wherein the reference location corresponds to one of the plurality of mounting structures.

5. The method according to claim 1, further comprising:
   after coupling the IMU to each of the mounting structures on the vehicle in the sequence, re-coupling the IMU to a particular mounting structure that was in the sequence;

while the IMU is re-coupled to the particular mounting structure, obtaining an additional mounting-location inertial measurement using the IMU; and comparing the additional mounting-location inertial measurement to the mounting-location inertial measurement that was previously measured at the particular mounting structure to determine an IMU drift parameter.

6. The method according to claim 5, wherein the particular mounting structure was first in the sequence.

7. The method according to claim 5, further comprising using the IMU drift parameter to determine the measured elevational angles, roll angles, and azimuthal angles.

8. The method according to claim 5, wherein if the IMU drift parameter exceeds a threshold, providing an alert.

9. An apparatus comprising:

an inertial measurement unit (IMU);

a mounting plate configured to couple the IMU to each of a plurality of mounting structures on a vehicle, wherein each of the mounting structures is configured to couple to a respective radar unit; and a computational unit configured to perform operations comprising:

use the IMU to obtain a reference-location inertial measurement at a reference location;

use the IMU to obtain respective mounting-location inertial measurements when the IMU is coupled to each of the mounting structures in a sequence; and for each mounting structure:

determine a measured elevational angle, a measured roll angle, and measured azimuthal angle based on at least the mounting-location inertial measurement obtained at the mounting structure and the reference inertial measurement;

determine an elevational offset based on a difference between the measured elevational angle and a target elevational angle;

determine a roll offset based on a difference between the measured roll angle and a target roll angle; and determine an azimuthal offset based on a difference between the measured azimuthal angle and a target azimuthal angle.

10. The apparatus according to claim 9, wherein the reference-location inertial measurement comprises a measurement of movement of the Earth.

11. The apparatus according to claim 9, wherein the reference location is located away from the vehicle.

12. The apparatus according to claim 9, wherein the reference location corresponds one of the plurality of mounting structures.

13. The apparatus according to claim 9, wherein the operations further comprise:

while the IMU is re-coupled to a particular mounting structure that was in the squence, obtaining an additional mounting-location inertial measurement using the IMU;

comparing the additional mounting-location inertial measurement to the mounting-location inertial measurement that was previously measured at the particular mounting structure to determine an IMU drift parameter.

14. The apparatus according to claim 13, wherein the particular mounting structure was first in the sequence.

15. The apparatus according to claim 13, further comprising using the IMU drift parameter to determine the measured elevational angles, roll angles, and azimuthal angles.

16. The apparatus according to claim 13, wherein if the IMU drift parameter exceeds a threshold, providing an alert.

17. An article of manufacture including a non-transitory computer-readable medium, having stored thereon program instructions that, if executed by a computing device, cause the computing device to perform operations comprising:

obtaining a reference-location inertial measurement using an inertial measurement unit (IMU) at a reference location, wherein the IMU can be coupled to each of a plurality of mounting structures on a vehicle, wherein each of the mounting structures is configured to couple to a respective radar unit;

using the IMU to obtain a respective mounting-location inertial measurements when the IMU is coupled to each of the mounting structures in a sequence; and for each mounting structure:

determining a measured roll angle, measured elevational angle, and measured azimuthal angle based on at least the mounting-location inertial measurement obtained at the mounting structure and the reference inertial measurement;

determining an elevational offset based on a difference between the measured elevational angle and a target elevational angle;

determining a roll offset based on a difference between the measured roll angle and a target roll angle; and determining an azimuthal offset based on a difference between the measured azimuthal angle and a target azimuthal angle.

18. The article of manufacture according to claim 17, wherein the reference-location inertial measurement comprises a measurement of movement of the Earth.

19. The article of manufacture according to claim 17, wherein the reference location is one of a location away from the vehicle and one of the plurality of mounting structures.

20. The article of manufacture according to claim 17, wherein the operations further comprise:

while the IMU is re-coupled to a particular mounting structure that was in the sequence, obtaining an additional mounting-location inertial measurement using the IMU;

comparing the additional mounting-location inertial measurement to the mounting-location inertial measurement that was previously measured at the particular mounting structure to determine an IMU drift parameter.

\* \* \* \* \*